United States Patent
Jones et al.

(10) Patent No.: US 6,711,476 B2
(45) Date of Patent: Mar. 23, 2004

(54) METHOD AND COMPUTER PROGRAM PRODUCT FOR ESTIMATING AT LEAST ONE STATE OF A DYNAMIC SYSTEM

(75) Inventors: Richard D. Jones, Issaquah, WA (US); Thomas E. Speer, Des Moines, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/967,403

(22) Filed: Sep. 27, 2001

(65) Prior Publication Data

US 2003/0060939 A1 Mar. 27, 2003

(51) Int. Cl.⁷ ............................. G05D 1/08; G05B 5/01; G06F 15/50
(52) U.S. Cl. ............................. 701/3; 701/220; 244/223
(58) Field of Search ................................. 701/3, 4, 220, 701/226, 214, 207, 213, 221, 224, 5, 7, 8; 244/223, 180, 175, 181, 176, 191, 195, 178, 194, 192, 76 R, 196, 197; 318/628, 611; 700/29, 55, 46

(56) References Cited

U.S. PATENT DOCUMENTS

| | | | |
|---|---|---|---|
| 3,940,673 A | | 2/1976 | Darlington ................. 318/584 |
| 3,945,593 A | * | 3/1976 | Schanzer ................. 244/77 D |
| 4,236,685 A | * | 12/1980 | Kissel ....................... 244/223 |
| 5,008,825 A | * | 4/1991 | Nadkarni et al. ........... 364/434 |
| 5,424,950 A | * | 6/1995 | Jackson ..................... 364/434 |
| 5,528,119 A | | 6/1996 | Rundqwist et al. ......... 318/632 |
| 5,695,156 A | | 12/1997 | Firuz et al. ................ 244/180 |
| 6,047,927 A | | 4/2000 | Heiberg et al. ............ 244/165 |
| 6,085,127 A | * | 7/2000 | Vos ............................. 701/4 |
| 6,128,554 A | | 10/2000 | Damotte ....................... 701/4 |
| 6,539,290 B1 | * | 3/2003 | Vos ............................. 701/3 |

FOREIGN PATENT DOCUMENTS

| | | |
|---|---|---|
| EP | 0 275 664 A | 7/1988 |
| EP | 0 438 887 A | 7/1991 |
| EP | 1 052 558 A | 11/2000 |

* cited by examiner

*Primary Examiner*—Tan Q. Nguyen
*Assistant Examiner*—Dalena Tran
(74) *Attorney, Agent, or Firm*—Alston & Bird LLP (57) ABSTRACT

A method and computer program product are provided for estimating the states of a dynamic system based upon a combination of first and second feedback signals. The first feedback signal is based upon anticipated state changes and is typically represented by a state propagation model. The second feedback signal is based upon the difference between the anticipated and actual measurements of the sensors. This difference may be weighted based upon a predetermined criteria, such as the credibility of the actual measurements and/or the degree to which outlying sensor measurements are to be discounted. The weighted difference is converted into a corresponding change in the state estimates. At least one feedback signal may then be modified to define its relative contribution to the state estimates. The first and second feedback signals are thereafter combined to produce the state estimates, subject generally to limitations upon the permissible changes in the state estimates.

40 Claims, 2 Drawing Sheets

METHOD AND COMPUTER PROGRAM PRODUCT FOR ESTIMATING AT LEAST ONE STATE OF A DYNAMIC SYSTEM

FIELD OF THE INVENTION

The present invention relates generally to a method of estimating at least one state of a dynamic system, such as an aerodynamic vehicle, and, more particularly, to a method of estimating at least one state of a dynamic system based upon a combination of the anticipated change in the at least one state of the dynamic system and a correction based upon the anticipated and actual measurements of at least one sensor.

BACKGROUND OF THE INVENTION

A wide variety of dynamic systems utilize automatic control. For example, aerodynamic vehicles utilize automatic control to establish, maintain and alter their flight path. These dynamic systems generally include a number of actuators to affect the desired behavior. Depending upon the type of dynamic system, a wide variety of actuators may be utilized. With respect to an aerodynamic vehicle, for example, the actuators may include the rudder, elevators, ailerons, speed brakes, engine thrust variations, thrust vectoring and the like. These dynamic systems also include a number of sensors for measuring various parameters that at least partially define the current state of the dynamic system. An aerodynamic vehicle, for example, includes a large number of sensors including accelerometers, angle of attack vanes, an altimeter and the like.

The automatic control of a dynamic system is oftentimes improved by estimating the states of the dynamic system. The states of the dynamic system will vary greatly depending upon the type of dynamic system. Even with respect to an aerodynamic vehicle, the relevant states may vary somewhat depending upon the type and model of the aerodynamic vehicle. However, the states of an aerodynamic vehicle, as typically defined by its system state vector, includes the angle of attack, the angle of side slip, the air speed, the vehicle attitude and the like. Typically, the estimates of the states of a dynamic system have been derived from measurements provided by the sensors and a-priori knowledge of the dynamics of the system. As will be apparent, any improvement in the automatic control of a dynamic system is only improved by the estimates of the states of the dynamic systems if the estimates are accurate.

Most conventional techniques for estimating the states of a dynamic system attempt to minimize the sum of the squares of the error between the actual measurement provided by each sensor and the projected or anticipated measurement of the same sensor. In this regard, the anticipated measurement of a sensor is based upon a model of the dynamic system constructed in accordance with the a-priori knowledge of the dynamic system. Devices utilizing the foregoing approach to estimating the states of a dynamic system are typically referred to as squared error based filters.

The estimates of the states of a dynamic system provided by a squared error based filter are greatly influenced by the actual measurements of those sensors that differ greatly from the anticipated measurements. These greatly differing measurements are generally referred to as outlier measurements. Unfortunately, a sensor that provides an outlier measurement has oftentimes failed. Since a squared error based filter generates estimates of the states of the dynamic system in a manner that attempts to minimize differences between the actual and anticipated measurements of the sensors, the outlier measurements provided by the sensor(s) that have potentially failed can adversely alter or skew the resulting estimates of the states of the dynamic system, sometimes to a great extent.

Additionally, the actual measurements provided by some sensors may have more credibility or engender more confidence than the actual measurements provided by other sensors, even in instances in which all the sensors are functioning properly. Unfortunately, conventional techniques for estimating the states of a dynamic system do not take the relative degrees of confidence in the actual measurements provided by the sensors into consideration in the estimation of the states of the dynamic system.

The permissible changes in at least some of the states of a dynamic system may be limited. For example, the rate of change of a state of a dynamic system may be limited to a range bounded by upper and/or lower limits. Similarly, the state itself may be limited to within a predefined range, also typically defined by upper and/or lower bounds. For example, the angle of attack of an aerodynamic vehicle will be limited in that the rate of change of the angle of attack may only vary within a predefined range and the angle of attack itself must lie within a predefined range. Unfortunately, conventional techniques for estimating the states of a dynamic system do not take into account the limitations in the permissible changes in the states of a dynamic system. As such, conventional techniques may generate estimates of the states of the dynamic system that would cause the limitations imposed upon a state to be exceeded by either requiring a state to change too rapidly or to have a value that falls outside a predefined range of acceptable values.

As such, it would be advantageous to develop an improved and a more accurate method of estimating the states of a dynamic system. In this regard, it would be desirable to provide a method of estimating the states of a dynamic system that is relatively insensitive to the erroneous measurements provided by sensors that have potentially failed. Additionally, it would be desirable to provide a method of estimating the states of a dynamic system that permitted the relative confidence in the actual measurements provided by the various sensors to be considered. Still further, it would be desirable to provide a method of estimating the states of a dynamic system that took into account the limitations upon the permissible changes in the states of a dynamic system such that the resulting estimates of the states did not cause a state to vary too rapidly or to assume a value falling outside a predefined range of acceptable values.

SUMMARY OF THE INVENTION

An improved method and computer program product are provided for more accurately estimating the states of a dynamic system including, but not limited to, an aerodynamic vehicle. According to one aspect of the present invention, the method and computer program product are relatively insensitive to the actual measurements provided by sensors that may have failed. According to another aspect of the present invention, the method and computer program product take into account the relative confidence in the actual measurements provided by the various sensors. In yet another aspect of the present invention, the method and computer program product limit the permissible changes in the estimates of the states of the dynamic system such that the estimates do not attempt to cause any state to change too rapidly or to have a value that falls outside the predefined range of values that are acceptable for a respective state. By improving the estimates of the states of a dynamic system, the method and computer program product of the present invention also thereby permit an automatic control system utilizing the estimates of the states to provide improved control of the dynamic system.

The method and computer program product of the present invention accurately estimate at least one state of a dynamic system having at least one actuator and at least one sensor by generating first and second feedback signals that are then combined to produce the estimate of the at least one state of the dynamic system. The first feedback signal is at least partially based upon an anticipated change in the at least one state of the dynamic system. This anticipated change is attributable to the current estimate of the at least one state of the dynamic system and the commanded state of the at least one actuator. This anticipated change is independent, however, of the actual measurements provided by the at least one sensor. In one embodiment, the first feedback signal is at least partially based upon a state propagation model representative of the anticipated change in the at least one state of the dynamic system attributable to the current estimate of the at least one state of the dynamic system and the commanded state of the at least one actuator.

The second feedback signal is at least partially based upon the anticipated measurement of the at least one sensor and the actual measurement of the at least one sensor. In this regard, the second feedback signal is preferably at least partially based upon the difference between the anticipated and actual measurements of the at least one sensor. The anticipated measurement of the at least one sensor may be provided by a sensor output model representative of the anticipated measurement of the at least one sensor based upon the current estimate of the at least one state of the dynamic system and the commanded state of the at least one actuator.

According to one aspect of the present invention, the difference between the anticipated and actual measurements of the at least one sensor is weighted based upon a predetermined criteria. Advantageously, the difference between the anticipated and actual measurements of each sensor may be separately weighted based upon the relative credibility of the actual measurements provided by each respective sensor. Thus, the method and computer program product of this aspect of the present invention take into account the relative confidence in the actual measurements provided by the sensors. In addition or in the alternative, the difference between the anticipated and actual measurements of each sensor may be weighted with a predefined penalty having an effect that varies based upon the magnitude of a respective difference. The penalty may be predefined based upon the degree to which outlying sensor measurements are to be discounted. For example, a relatively large predefined penalty will greatly discount actual measurements provided by sensors that differ greatly from the corresponding anticipated measurements. As such, the method and computer program product of this aspect of the present invention permit the estimates of the states of the dynamic system to be rendered insensitive or less sensitive to sensor failures, if so desired. Alternatively, a relatively small predefined penalty may be utilized to emphasize the outlying sensor measurements in order to detect sensors that may have potentially failed.

The weighted difference between the anticipated and actual measurements of the at least one sensor may be converted into a corresponding change in the estimate of the at least one state of the dynamic system. In this regard, a first dot product of a vector representing the weighted differences between the anticipated and actual measurements of each sensor and a transpose of a matrix representing changes in the sensor output model that arise as a result of changes in the estimate of the at least one state of the dynamic system is determined. The first dot product therefore serves to convert the weighted difference between the anticipated and actual measurements of the at least one sensor into a corresponding change in the estimate of the at least one state of the dynamic system.

At least one of the first and second feedback signals may also be modified prior to being combined in order to at least partially define the relative contributions of the first and second feedback signals to the estimate of the at least one state of the dynamic system. For example, the first feedback signal may be emphasized if the estimates of the states of the dynamic system attributable to the system propagation model are believed to be more accurate or meaningful than the estimates of the states of the dynamic system attributable to the sensor measurements. Alternatively, the second feedback signal may be emphasized in instances in which the estimates of the states of the dynamic system based upon the sensor measurements are considered more accurate or reliable than the estimates of the states of the dynamic system based upon the state propagation model. Thus, the estimate of each individual state of the dynamic system may be tailored as desired. In one embodiment, the relative contributions of the first and second feedback signals to the estimate of the at least one state of the dynamic system is defined by determining a second dot product of the first dot product and a gain matrix. As such, the second feedback signal is emphasized or deemphasized relative to the first feedback signal depending upon the terms of the gain matrix.

The first and second feedback signals are combined to produce the estimate of the at least one state of the dynamic system. According to another aspect of the present invention, the permissible changes in the estimate of the at least one state of the dynamic system may be limited based upon a predetermined criteria. For example, the permissible rate of change of the estimate of the at least one state of a dynamic system may be limited. In addition or in the alternative, the estimate of the at least one state of the dynamic system may be limited to be within a predefined range. As such, the method and computer program product of this aspect of the present invention will generate estimates of the state of the dynamic system that are within the predefined limitations imposed upon the states, thereby further increasing the reliability of the estimates by limiting the permissible estimates to those that are achievable.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A method and a corresponding computer program product are provided for estimating the states of a dynamic system. The method and computer program product are capable of estimating the states of a wide variety of dynamic systems including, for example, an aerodynamic vehicle, such as an aircraft. Other examples of dynamic systems for which the method and computer program product of the present invention are capable of estimating the states include commercial navigation systems and GPS receivers. In this regard, the method and computer program product of the present invention are capable of being utilized in the same applications as a Kalman filter. For purposes of explanation, but not of limitation, however, the method and computer program product of the present invention will be primarily described hereinbelow in conjunction with the estimating of the states of an aerodynamic vehicle, such as an aircraft.

Regardless of the type of dynamic system, the dynamic system has at least one actuator and at least one sensor. The number and type of actuators and sensors will vary greatly depending upon the type of dynamic system. For a particular type of dynamic system, however, the number and type of actuators and sensors will be well established and known to those skilled in the art. With respect to an aerodynamic vehicle, for example, the aerodynamic vehicle will include a number of actuators including the rudder, elevators, ailerons, speed brakes, engine thrust variations, thrust vectoring and the like. With respect to the sensors, an aerodynamic vehicle will also include a wide variety of sensors including accelerometers, angle of attack vanes, an altimeter and the like.

Figure 1:
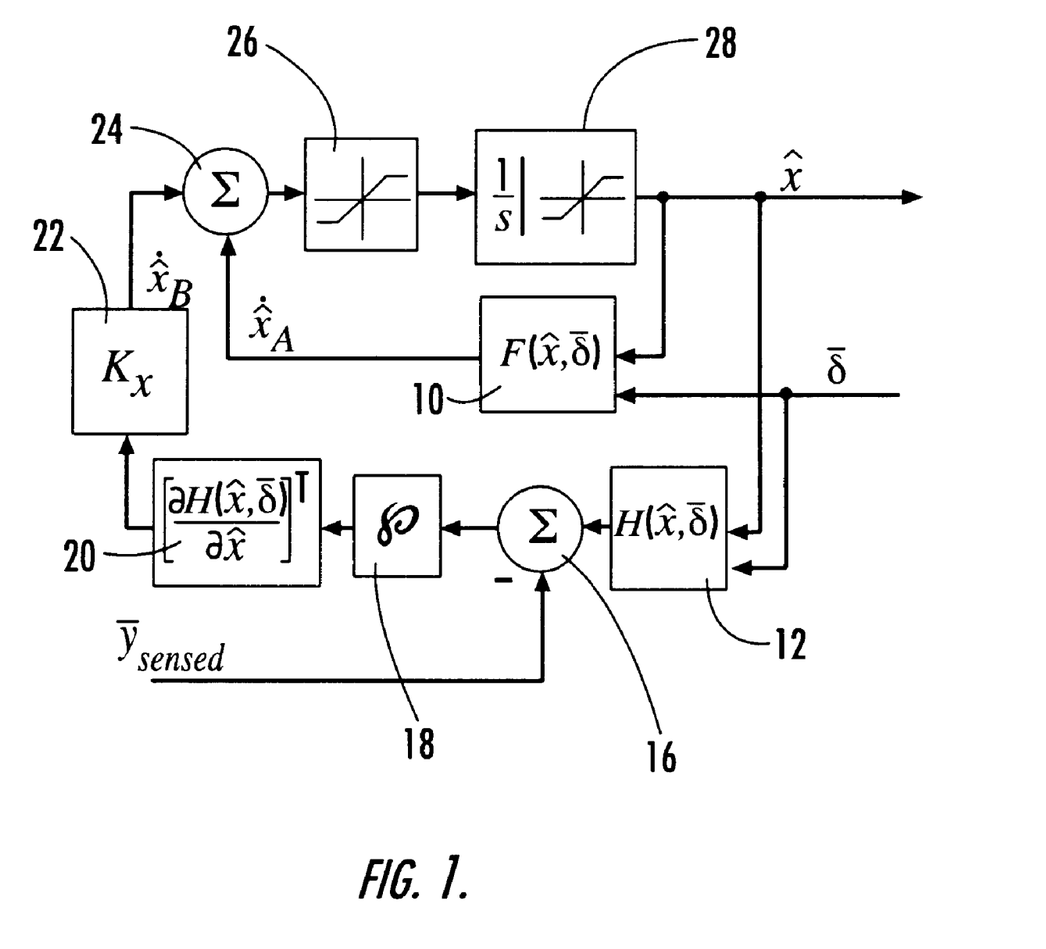
FIG. 1 is a block diagram illustrating the operations performed by the method and computer program product of one embodiment of the present invention.

Referring to FIG. 1, a block diagram representation of the operations performed by the method and computer program product of one advantageous embodiment of the present invention is illustrated. As shown, the method utilizes first and second feedback loops that extend substantially in parallel for generating first and second feedback signals, respectively. The first and second feedback signals are each representative of estimates of the states of the dynamic system. In the embodiment depicting FIG. 1, the first and second feedback signals $\dot{\hat{x}}_A$ and $\dot{\hat{x}}_B$ are estimates of the rate of change of the states of the dynamic system which are, in turn, converted in estimates of the actual states of the dynamic system. However, the first and second feedback signals may, instead, be estimates of the states themselves, if so desired. In either instance, the first and second feedback signals are generally somewhat different since they are formulated in different manners as described hereinbelow. By appropriately combining the first and second feedback signals, the method and computer program product of the present invention can obtain more accurate and reliable estimates of the states of the dynamic system than conventional estimation techniques.

According to the illustrated embodiment, the first feedback signal $\dot{\hat{x}}_A$ is based upon a state propagation model F ($\hat{x},\bar{\delta}$). See block 10 of FIG. 1. The state propagation model provides an output representative of the anticipated change in the states of the dynamic system based upon the current estimate of the states of the dynamic system $\hat{x}$ and the commanded state $\bar{\delta}$ of the actuators. The state propagation model of the dynamic system models the dynamics of the system and is based upon a-priori knowledge of the system. As such, the state propagation model will vary depending upon the type of dynamic system that is being analyzed. For a particular dynamic system, however, the state propagation model is well defined and known to those skilled in the art. For example, state propagation models are well known to those skilled in the art and are commonly utilized by Kalman filters and, furthermore, in the aerodynamic context, in the control systems of flight simulators.

With respect to an aerodynamic vehicle, for example, the state propagation model F may be based upon force buildup equations. The force buildup equations will generally vary depending upon the type and model of the aerodynamic vehicle. For a particular type of model of an aerodynamic vehicle, however, the force buildup equations are well established and known to those skilled in the art. The force buildup equations generally require a variety of aerodynamic coefficients associated with the current flight condition, as defined by the current states of the aerodynamic vehicle. As known to those skilled in the art, aerodynamic databases are available for most aerodynamic vehicles that define the various aerodynamic coefficients based upon the current states of the aerodynamic vehicle. The aerodynamic coefficients of an aerodynamic vehicle may vary based upon the type and model of the aerodynamic vehicle, but typically include coefficients such as lift, drag, pitching moment, side force, rolling moment, yawing moment and the like. While the aerodynamic coefficients may vary based upon the type and model of the aerodynamic vehicle, the aerodynamic coefficients for a particular type and model of aerodynamic vehicle will be well defined and known to those skilled in the art. For example, an aerodynamic database for a 777 model aircraft manufactured by The Boeing Company is provided along with each aircraft and defines 384 aerodynamic coefficients. In addition, force buildup equations require the current vehicle state and the current commanded state $\bar{\delta}$ of the actuators. Based upon the inputs, the force buildup equations can determine the resulting forces and torques imposed upon the aerodynamic vehicle. By factoring out the mass and inertia of the aerodynamic vehicle, the anticipated rate of change of each state of the aerodynamic vehicle may be determined. Further details regarding state propagation models are provided by Peter S. Maybeck, *Stochastic Models Estimation and Control*, Academic Press, Volumes 1–3.

The anticipated rate of change of each state of the dynamic system that is based upon the state propagation model serves as the first feedback signal $\dot{\hat{x}}_A$. While the first feedback signal is based upon the state propagation model F which, in turn, considers the current estimates of the states of the dynamic system $\hat{x}$ and the commanded states $\bar{\delta}$ of the actuators, neither the state propagation model nor the resulting estimates of the rates of change of the states of the dynamic system are dependent upon the measurements provided by the sensors.

In contrast, the second feedback signal $\dot{\hat{x}}_B$ is dependent upon the actual measurements provided by the sensors. In this regard, a sensor output model H ($\hat{x},\bar{\delta}$) is provided as shown in block 12 of FIG. 1. The sensor output model determines the anticipated measurement of each sensor based upon the current estimate of the states of the dynamic system $\hat{x}$ and the commanded states $\bar{\delta}$ of the actuators. Depending upon the type of dynamic system and the types of sensors utilized by the dynamic system, the sensor output model may vary greatly. For particular dynamic system having a specific configuration of sensors, however, the sensor output model is well-defined and known to those skilled in the art. In this regard, sensor output models are commonly utilized by Kalman filters. Further details regarding sensor output models are provided also by Peter S. Maybeck, *Stochastic Models Estimation and Control*, Academic Press, Volumes 1–3.

By way of example, the sensor output model H of an aerodynamic vehicle is dependent upon the sensors carried by the aerodynamic vehicle. For each sensor, the sensor output model predicts the resulting measurement of the sensor based upon the current estimate of the states of the aerodynamic vehicle $\hat{x}$ and the commanded state $\bar{\delta}$ of the actuators. Generally, kinematic equations are developed for each sensor relating the anticipated measurement of the sensor to the current estimate of the states of the aerodynamic vehicle and the commanded state of the actuators.

In addition to the anticipated measurements of the sensors, the second feedback signal $\hat{x}_B$ is also at least partially based upon the actual measurements of the sensors $\bar{y}_{sensed}$. In this regard, the difference between the anticipated measurement of a sensor and the actual measurement of the sensor may be determined for each sensor as shown in block 16. This difference may be attributable to a variety of factors including noise or error in the actual measurements provided by the sensor and/or imperfections in the sensor output model H. Typically, the anticipated measurements of the sensors and the actual measurements of the sensors are represented by respective vectors with each term of the respective vector corresponding to the measurement of a specific sensor. As such, the vector difference between the anticipated and actual measurements of the sensors is typically determined, as shown in block 16.

According to one advantageous aspect of the present invention, the difference between the anticipated and actual measurements of the sensors may be weighted based upon the predetermined criteria. One predetermined criteria is the relative credibility of the actual measurements $\bar{y}_{sensed}$ provided by the sensors. Thus, the actual measurements provided by sensors having greater credibility may be weighted with weighting factors $w_i$ more heavily than the actual measurements provided by sensors having less credibility. Thus, this type of weighting permits the relative confidence in the actual measurements provided by the various sensors to be taken into account. As such, a respective weight may be assigned to each sensor, such as during the initial configuration of the system.

Another predetermined criteria is a predefined penalty $p_i$ that serves to place greater or lesser emphasis on the actual measurements $\bar{y}_{sensed}$ provided by the sensors that differ greatly from the anticipated measurements of the respective sensors, i.e., outlier sensor measurements. The effect of the predefined penalty will therefore vary based upon the magnitude of the difference between the anticipated and actual measurements of a respective sensor. Since relatively large differences are typically associated with a sensor that has failed, the predefined penalty may be selected to either emphasize or de-emphasize these differences. In order to continue to accurately estimate the states of the dynamic system, the predefined penalty is preferably selected to de-emphasize outlying sensor measurements that differ greatly from the corresponding anticipated measurements. As such, the second feedback signal $\hat{x}_B$ generated in accordance with this embodiment which imposes relatively large predefined penalties upon outlier sensor measurements reduces the sensitivity of the estimates to the measurements provided by failed sensors. Alternatively, the method and computer program product of the present invention may be utilized to detect failed sensors. In this regard, outlying sensor measurements may be emphasized by utilizing a small predefined penalty, if any. As such, sensors that may have failed can be identified and repaired or replaced in an expeditious manner, if so desired.

In order to effect the weighting, the vector function $\wp$ is defined as follows:

$$\wp(\bar{v},\bar{w},\bar{p})_i = w_i \operatorname{sgn}(v_i)\|v_i\|^{p_i-1}$$

wherein $w_i$ is a weight assigned to each sensor reflective of the credibility of or the confidence in the measurements provided by the respective sensor, $p_i$ is a predefined penalty factor assigned to each sensor, $v_i$ is the difference between the anticipated and actual measurements of each sensor. Both $w_i$ and $p_i$ are defined to be greater than or equal to zero. By multiplying the vector difference between the anticipated and actual measurements of each sensor and the vector function $\wp$ as shown in block 18 of FIG. 1, the weighted difference between anticipated and actual measurements of each sensor is obtained.

The weighted difference between the anticipated and actual measurements of the sensors is then converted into corresponding estimates $\hat{x}_B$ of the rates of change of the states of the dynamic system by projecting the weighted difference between the anticipated and actual measurements of the sensors into state space. In the illustrated embodiment, for example, the weighted difference between the anticipated and actual measurements of each sensor is multiplied by the transpose $$\left[\frac{\partial H(\hat{x}, \bar{\delta})}{\partial \hat{x}}\right]^T$$

of a matrix representing changes in the anticipated measurements of the sensors provided by the sensor output model H as a result of changes in the estimate of each state $\hat{x}$ of the dynamic system. In other words, a first dot product of the weighted vector difference provided by block 18 and the transpose of the matrix representing changes in the anticipated measurements of the sensors provided by the sensor output model as a result of changes in the estimate of each state of the dynamic system, is determined. See block 20 of FIG. 1. Thus, each term of the matrix represents the change in the anticipated measurement of a respective sensor based upon the change in a respective state of the dynamic system. Each row of the matrix therefore includes terms representing changes in the anticipated measurements of the sensors based upon a change in one state of the dynamic system, while each column of the matrix includes terms representing changes in the anticipated measurements of one sensor based upon changes in different states of the dynamic system. Thus, the dot product of the weighted vector difference between the anticipated and actual measurements of the sensors and the matrix converts the weighted difference between the anticipated and actual measurements of the sensors into corresponding estimates of the rates of change of the states of the dynamic system.

The matrix $$\left[\frac{\partial H(\hat{x}, \bar{\delta})}{\partial \hat{x}}\right]$$

representing changes in the anticipated measurements of the sensors provided by the sensor output model as a result of changes in the estimate of each state of a dynamic system may be constructed in various fashions. Since the sensor output model H typically consists of a number of kinematic equations expressing the anticipated measurement of respective sensors based upon the current estimates of the states $\hat{x}$ of the dynamic system and the commanded states $\bar{\delta}$ of the actuators, the partial derivatives of the sensor output model with respect to changes in the estimates of respective states of the dynamic system that form the terms of the matrix may be derived directly. Alternatively, if the sensor output model does not include a number of kinematic equations, but is, instead, data or a table establishing corresponding inputs and outputs of the respective sensors, the partial derivatives of the sensor output model that forms each term (designated (i, j)) of the matrix may be approximated by finite differencing as described hereinbelow:

$$\left(\frac{\partial H(\hat{x}, \bar{\delta})}{\partial \hat{x}}\right)_{i,j} \approx \frac{H(\tilde{x}, \bar{\delta})_i - H(\hat{x}, \bar{\delta})_i}{\varepsilon}$$

wherein $\{\tilde{x}_{k\ne j}=\hat{x}_k\} \cap \{\tilde{x}_{k=j}=\hat{x}_k+\epsilon\}$ and wherein C is a very small, positive number, i.e., $0<\epsilon<<1$.

Prior to combining the first and second feedback signals $\dot{\hat{x}}_A$ and $\dot{\hat{x}}_B$, at least one of the feedback signals is modified so as to at least partially define the relative contributions of the first and second feedback signals to the estimate of the states $\hat{x}$ of the dynamic system. While either or both of the feedback signals may be modified to define the relative contributions of the first and second feedback signals to the resulting combination, the example depicted in FIG. 1 includes a gain matrix $K_{i,j}$ that weights the first dot product of the weighted vector difference and the transpose of the matrix of partial derivatives of the sensor output model with respect to changes in the estimates of respective states of the dynamic system. See block 22 of FIG. 1. In this regard, the gain matrix is typically a diagonal, positive, semi-definite matrix, i.e., $\{K_{i=j}\geq 0\} \cap \{K_{i\ne j}=0\}$, with one term of the gain matrix associated with the estimated rate of change of each respective state of the dynamic system.

Although the gain matrix $K_{I,j}$ can be constructed in various manners, the gain matrix of one embodiment includes values that range from 0 to 1 with larger values of K weighting the second feedback signal $\dot{\hat{x}}_B$ more heavily, while smaller values of K weight the second feedback signal to a lesser degree. Thus, if a relatively high K value is utilized, the resulting combination of the first and second feedback signals will define the estimated rate of change of the respective state based more on the second feedback signal than the first feedback signal. In other words, the resulting estimate of the rate of change of the respective state of the dynamic system will be based more upon the anticipated and actual sensor measurements than the state propagation model F. Conversely, relatively low values of K will cause the estimate of the rate of change of the respective state of the dynamic system resulting from the combination of the first and second feedback signals to be more greatly influenced by the first feedback signal than the second feedback signal. In other words, the resulting estimate of the rate of change of the respective state of the dynamic system will be more greatly influenced by the state propagation model than the anticipated and actual measurements of the sensors. Taken to the extreme, a K value of 1 will base the resulting estimate of the rate of change of a respective state of the dynamic system entirely upon the second feedback signal, while a K value of 0 will base the resulting estimate of a rate of change of the respective state of the dynamic system entirely upon the first feedback signal. Thus, the gain matrix also permits the estimation technique of the present invention to be individually tailored for the particular dynamic system based upon the relative confidence in the state propagation model F, the sensor output model H and the sensors themselves.

After the first and second feedback signals $\dot{\hat{x}}_A$ and $\dot{\hat{x}}_B$ have been combined, such as by summing the vectors representing the first and second feedback signals as shown in block 24 of FIG. 1, estimates of the rates of change of the state of the dynamic system are provided according to the illustrated embodiment of the present invention. According to one advantageous aspect of the present invention, the resulting estimate may be limited based upon a predetermined criteria. As shown in FIG. 1, the estimates of the rates of change of the states the dynamic system may be limited to a predetermined range bounded by upper and/or lower boundaries as shown graphically as block 26 of FIG. 1. Thus, the estimate of the rate of change of each state of the dynamic system will be limited to a realistic or practical range and an estimate will not be developed that would require the respective state to change more than is possible.

In order to generate estimates of the states $\hat{x}$ of the dynamic system, the estimates of the rates of change of the states $\hat{x}$ of the dynamic system are integrated, as indicated by 1/s in block 28 of FIG. 1. Thereafter, the estimates of the states of the dynamic system may also be limited such that the estimate of each state of the dynamic system will fall within a predefined range of permissible estimates bounded by upper and/or lower boundaries is also shown in block 28. The limitations on the permissible rates of change and the limitations on the states themselves may vary from state to state and are selected to avoid the generation of estimates that are impossible or otherwise not permitted.

The resulting estimates of the states $\hat{x}$ of the dynamic system may then be utilized by the control system of the dynamic system to provide more refined control of the dynamic system.

By weighting the differences between the anticipated and actual measurements of the sensors, the method and computer program product of the present invention effectively estimates the states of the dynamic system in a manner which minimizes the associated costs as defined by the weighting. In this regard, the cost of a change in the estimate of a state of a dynamic system is defined as follows:

$$\text{cost}(\bar{x}, \bar{\delta}, \bar{w}, \bar{p}, \bar{y}_{sensed})_i = w_i sgn(H(\hat{x}, \bar{\delta})_i - \bar{y}_{sensed_i})\|H(\hat{x}, \bar{\delta})_i - \bar{y}_{sensed_i}\|^{p_i-1}$$

By way of further explanation, it is noted that in instances in which $p_i=2$, the cost becomes the L2 norm that is defined as follows:

$$\text{cost}(\hat{x}, \bar{y}, \bar{\delta}, \bar{w}, \bar{p}) = \sum_{i=1}^{n} w_i \frac{1}{2}(H(\hat{x}, \bar{\delta})_i - \bar{y}_{sensed_i})^2$$

Similarly, in instances in which $p_i=1$, the cost becomes the L1 norm which is defined as follows:

$$\text{cost}(\hat{x}, \bar{y}, \bar{\delta}, \bar{w}, \bar{p}) = \sum_{i=1}^{n} w_i \|H(\hat{x}, \bar{\delta})_i - \bar{y}_{sensed_i}\|$$

Figure 2:
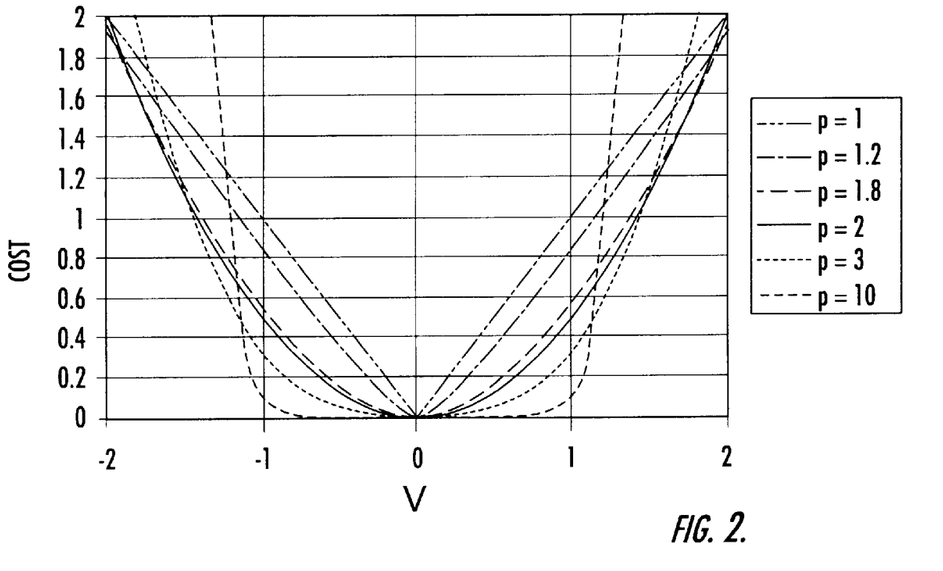
FIG. 2 is a graph representing the effect attributable to the imposition of different predefined penalties.
Figure 3:
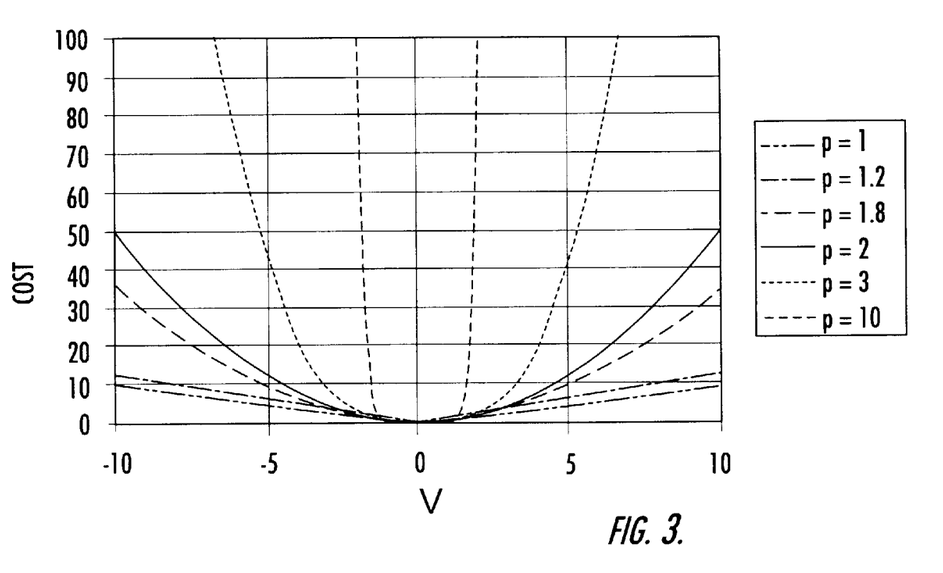
FIG. 3 is an expanded view of the graph of FIG. 2 illustrating the effect of the imposition of different predefined penalties.

Based upon the cost function, the affect of the predefined penalty $p_i$ that permits greater or lesser emphasis to be placed upon an outlier, i.e., a large difference between the anticipated and actual measurements of a sensor that is generally attributable to a failed sensor, can be illustrated. In this regard, FIGS. 2 and 3 are two different graphical illustrations of the same curves representing the relationship between the cost and the difference v between the anticipated and actual measurements of a respective sensor. As indicated, larger values of p, i.e., p>2, impose greater penalties upon outliers, thereby increasing the overall cost. Thus, larger values of p effectively emphasize outliers, thereby permitting sensors that have failed to be identified. Conversely, smaller values of p, i.e., 1<p<2, impose smaller penalties upon the outliers, thereby deemphasizing their contributions to the resulting estimates of the states of the dynamic system attributable to a failed sensor. In addition, the estimation of the states of the dynamic system may be further tailored as described above by establishing another weighting $w_i$ based upon the relative confidence in the measurements provided by the respective sensors.

As indicated above, the method of estimating the states of a dynamic system may be embodied by a computer program product. The computer program product includes a computer-readable storage medium, such as the non-volatile storage medium, and computer-readable program code portions, such as a series of computer instructions, embodied in the computer-readable storage medium. Typically, the computer program is stored by a memory device and executed by an associated processing unit, such as the flight control computer or the like.

In this regard, FIG. 1 is block diagram, flowchart and control flow illustrations of methods and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of estimating at least one operational state of a dynamic system utilizing at least partially automated control and having at least one actuator and at least one sensor, the method comprising:

generating a first feedback signal at least partially based upon an anticipated change in a value representative of the at least one operational state of the dynamic system that is attributable to a current estimate of the value representative of the at least one operational state of the dynamic system and the commanded state of the at least one actuator and independent of the actual measurement of any sensor;

generating a second feedback signal at least partially based upon a difference between a value of an anticipated measurement that is expected to be provided by the at least one sensor and a value of the actual measurement provided by the at least one sensor, wherein generating the second feedback signal comprises weighting the difference between the respective values of the anticipated and actual measurements of the at least one sensor based upon a predetermined criteria; and combining the first and second feedback signals to produce an estimate of the at least one operational state of the dynamic system.

2. A method according to claim 1 wherein weighting the difference between the respective values of the anticipated and actual measurements of the at least one sensor comprises separately weighting the difference between the respective values of the anticipated and actual measurements of each sensor based upon the relative credibility of the actual measurements provided by each respective sensor.

3. A method according to claim 1 wherein weighting the difference between the respective values of the anticipated and actual measurements of the at least one sensor comprises weighting each difference with a predefined penalty factor having an effect that varies based upon the magnitude of a respective difference.

4. A method according to claim 1 further comprising limiting permissible changes in the estimate of the at least one operational state of the dynamic system based upon a predetermined criteria.

5. A method according to claim 4 wherein limiting the permissible changes in the estimate of the at least one operational state of the dynamic system comprises limiting the permissible rate of change of the estimate of the at least one operational state of the dynamic system.

6. A method according to claim 4 wherein limiting the permissible changes in the estimate of the at least one operational state of the dynamic system comprises limiting the estimate of the at least one operational state of the dynamic system to within a predefined range.

7. A method according to claim 1 further comprising modifying at least one of the first and second feedback signals prior to their combination in order to at least partially define the relative contributions of the first and second feedback signals to the estimate of the at least one operational state of the dynamic system.

8. A method according to claim 1 wherein generating the second feedback signal further comprises converting the weighted difference between the respective values of the anticipated and actual measurements of the at least one sensor into a corresponding change in the estimate of the at least one operational state of the dynamic system that is attributable to the weighted difference between the respective values of the anticipated and actual measurements of the at least one sensor.

9. A method according to claim 1 wherein generating the first feedback signal at least partially based upon the anticipated change in the value representative of the at least one operational state of the dynamic system comprises generating the first feedback signal at least partially based upon a state propagation model representative of the anticipated change in the value representative of the at least one operational state of the dynamic system based upon the current estimate of the value representative of the at least one operational state of the dynamic system and the commanded state of the at least one actuator.

10. A method according to claim 1 wherein generating the second feedback signal at least partially based upon the difference between the respective values of the anticipated and actual measurements of the at least one sensor comprises generating the second feedback signal at least partially based upon a sensor output model representative of the anticipated measurement that is expected to be provided by the at least one sensor based upon the current estimate of the value representative of the at least one operational state of the dynamic system and the commanded state of the at least one actuator.

11. A method according to claim 10 wherein generating the second feedback signal further comprises determining a first dot product of a vector representing the weighted differences between the respective values of the anticipated and actual measurements of each sensor and a transpose of a matrix representing changes in the sensor output model as a result of changes in the estimate of the value representative of the at least one operational state of the dynamic system.

12. A method according to claim 11 wherein generating the second feedback signal further comprises determining a second dot product of the first dot product and a gain matrix to thereby modify the second feedback signal relative to the first feedback signal in order to at least partially define the relative contributions of the first and second feedback signals to the estimate of the value representative of the at least one operational state of the dynamic system.

13. A method of estimating at least one operational state of a dynamic system utilizing at least partially automated control and having at least one actuator and at least one sensor, the method comprising:

generating a first feedback signal at least partially based upon an anticipated change in a value representative of the at least one operational state of the dynamic system that is attributable to a current estimate of the value representative of the at least one operational state of the dynamic system and the commanded state of the at least one actuator and independent of the actual measurement of any sensor;

generating a second feedback signal at least partially based upon a value of an anticipated measurement that is expected to be provided by the at least one sensor and a value of the actual measurement provided by the at least one sensor;

combining the first and second feedback signals to produce an estimate of the at least one operational state of the dynamic system; and limiting permissible changes in the estimate of the at least one operational state of the dynamic system based upon a predetermined criteria.

14. A method according to claim 13 wherein limiting the permissible changes in the estimate of the at least one operational state of the dynamic system comprises limiting the permissible rate of change of the estimate of the at least one operational state of the dynamic system.

15. A method according to claim 13 wherein limiting the permissible changes in the estimate of the at least one operational state of the dynamic system comprises limiting the estimate of the at least one operational state of the dynamic system to within a predefined range.

16. A method according to claim 13 wherein generating the second feedback signal comprises weighting the difference between the respective values of the anticipated and actual measurements of the at least one sensor based upon a predetermined criteria.

17. A method according to claim 16 wherein weighting the difference between the respective values of the anticipated and actual measurements of the at least one sensor comprises separately weighting the difference between the respective values of the anticipated and actual measurements of each sensor based upon the relative credibility of the actual measurements provided by each respective sensor.

18. A method according to claim 16 wherein weighting the difference between the respective values of the anticipated and actual measurements of the at least one sensor comprises weighting each difference with a predefined penalty factor having an effect that varies based upon the magnitude of a respective difference.

19. A method according to claim 13 further comprising modifying at least one of the first and second feedback signals prior to their combination in order to at least partially define the relative contributions of the first and second feedback signals to the estimate of the at least one operational state of the dynamic system.

20. A method according to claim 13 wherein generating the second feedback signal further comprises converting the difference between the respective values of the anticipated and actual measurements of the at least one sensor into a corresponding change in the estimate of the at least one operational state of the dynamic system that is attributable to the difference between the respective values of the anticipated and actual measurements of the at least one sensor.

21. A method according to claim 13 wherein generating the first feedback signal at least partially based upon the anticipated change in the value representative of the at least one operational state of the dynamic system comprises generating the first feedback signal at least partially based upon a state propagation model representative of the anticipated change in the value representative of the at least one operational state of the dynamic system based upon the current estimate of the value representative of the at least one operational state of the dynamic system and the commanded state of the at least one actuator.

22. A method according to claim 13 wherein generating the second feedback signal at least partially based upon the difference between the respective values of the anticipated and actual measurements of the at least one sensor comprises generating the second feedback signal at least partially based upon a sensor output model representative of the anticipated measurement that is expected to be provided by the at least one sensor based upon the current estimate of the value representative of the at least one operational state of the dynamic system and the commanded state of the at least one actuator.

23. A method according to claim 22 wherein generating the second feedback signal further comprises determining a first dot product of a vector representing the weighted differences between the respective values of the anticipated and actual measurements of each sensor and a transpose of a matrix representing changes in the sensor output model as a result of changes in the estimate of the value representative of the at least one operational state of the dynamic system.

24. A method according to claim 23 wherein generating the second feedback signal further comprises determining a second dot product of the first dot product and a gain matrix to thereby modify the second feedback signal relative to the first feedback signal in order to at least partially define the relative contributions of the first and second feedback signals to the estimate of the value representative of the at least one operational state of the dynamic system.

25. A computer program product for estimating at least one operational state of a dynamic system utilizing at least partially automated control and having at least one actuator and at least one sensor, the computer program product comprising a computer-readable storage medium having computer-readable program code embodied in said medium, the computer-readable program code comprising:

a first executable portion adapted to generate a first feedback signal at least partially based upon an anticipated change in a value representative of the at least one operational state of the dynamic system that is attributable to a current estimate of the value representative of the at least one operational state of the dynamic system and the commanded state of the at least one actuator and independent of the actual measurement of any sensor;

a second executable portion adapted to generate a second feedback signal at least partially based upon a difference between a value of an anticipated measurement that is expected to be provided by the at least one sensor and a value of the actual measurement provided by the at least one sensor, wherein said second executable portion is also adapted to weight the difference between the respective values of the anticipated and actual measurements of the at least one sensor based upon a predetermined criteria; and a third executable portion adapted to combine the first and second feedback signals to produce an estimate of the at least one operational state of the dynamic system.

26. A computer program product according to claim 25 wherein said second executable portion is further adapted to separately weight the difference between the respective values of the anticipated and actual measurements of each sensor based upon the relative credibility of the actual measurements provided by each respective sensor.

27. A computer program product according to claim 25 wherein said second executable portion is further adapted to weight each difference with a predefined penalty factor having an effect that varies based upon the magnitude of a respective difference.

28. A computer program product according to claim 25 further comprising a fourth executable portion adapted to limit permissible changes in the estimate of the at least one operational state of the dynamic system based upon a predetermined criteria.

29. A computer program product according to claim 28 wherein said fourth executable portion is also adapted to limit the permissible rate of change of the estimate of the at least one operational state of the dynamic system.

30. A computer program product according to claim 28 wherein said fourth executable portion is also adapted to limit the estimate of the at least one operational state of the dynamic system to within a predefined range.

31. A computer program product according to claim 25 further comprising a fifth executable portion adapted to modify at least one of the first and second feedback signals prior to their combination in order to at least partially define the relative contributions of the first and second feedback signals to the estimate of the at least one operational state of the dynamic system.

32. A computer program product according to claim 25 wherein said second executable portion is further adapted to convert the weighted difference between the respective values of the anticipated and actual measurements of the at least one sensor into a corresponding change in the estimate of the at least one operational state of the dynamic system that is attributable to the weighted difference between the respective values of the anticipated and actual measurements of the at least one sensor.

33. A computer program product for estimating at least one operational state of a dynamic system utilizing at least partially automated control and having at least one actuator and at least one sensor, the computer program product comprising a computer-readable storage medium having computer-readable program code embodied in said medium, the computer-readable program code comprising:

a first executable portion adapted to generate a first feedback signal at least partially based upon an anticipated change in a value representative of the at least one operational state of the dynamic system that is attributable to a current estimate of the value representative of the at least one operational state of the dynamic system and the commanded state of the at least one actuator and independent of the actual measurement of any sensor;

a second executable portion adapted to generate a second feedback signal at least partially based upon a value of an anticipated measurement that is expected to be provided by the at least one sensor and a value of the actual measurement provided by the at least one sensor;

a third executable portion adapted to combine the first and second feedback signals to produce an estimate of the at least one operational state of the dynamic system; and a fourth executable portion adapted to limit permissible changes in the estimate of the at least one operational state of the dynamic system based upon a predetermined criteria.

34. A computer program product according to claim 33 wherein said fourth executable portion is also adapted to limit the permissible rate of change of the estimate of the at least one operational state of the dynamic system.

35. A computer program product according to claim 33 wherein said fourth executable portion is also adapted to limit the estimate of the at least one operational state of the dynamic system to within a predefined range.

36. A computer program product according to claim 33 wherein said second executable portion is also adapted to weight the difference between the respective values of the anticipated and actual measurements of the at least one sensor based upon a predetermined criteria.

37. A computer program product according to claim 36 wherein said second executable portion is further adapted to separately weight the difference between the respective values of the anticipated and actual measurements of each sensor based upon the relative credibility of the actual measurements provided by each respective sensor.

38. A computer program product according to claim 36 wherein said second executable portion is further adapted to weight each difference with a predefined penalty factor having an effect that varies based upon the magnitude of a respective difference.

39. A computer program product according to claim 33 further comprising a fifth executable portion adapted to modify at least one of the first and second feedback signals prior to their combination in order to at least partially define the relative contributions of the first and second feedback signals to the estimate of the at least one operational state of the dynamic system.

40. A computer program product according to claim 33 wherein said second executable portion is also adapted to convert the difference between the respective values of the anticipated and actual measurements of the at least one sensor into a corresponding change in the estimate of the at least one operational state of the dynamic system that is attributable to the difference between the respective values of the anticipated and actual measurements of the at least one sensor.

* * * * *